CALCULATING APPARATUS

Filed Sept. 8, 1961 4 Sheets-Sheet 1

Inventors
JACQUES Y. P. R. ROSENOER
RAYMOND E. A. SPRANGERS
By [signature]
Attorney Inventors
JACQUES Y. P. R. ROSENOER
RAYMOND E. A. SPRANGERS
By [signature]
Attorney

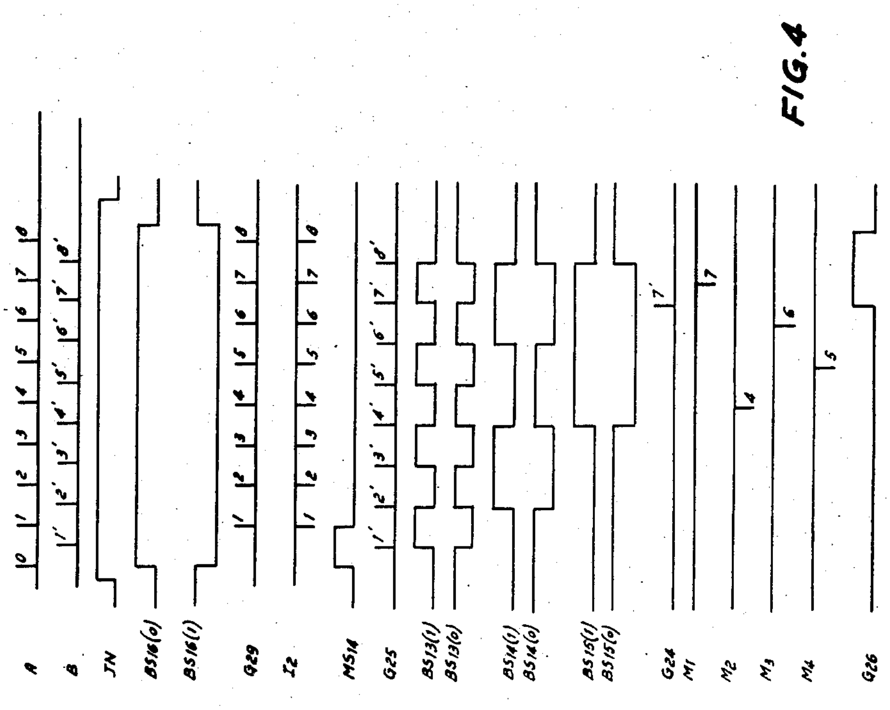
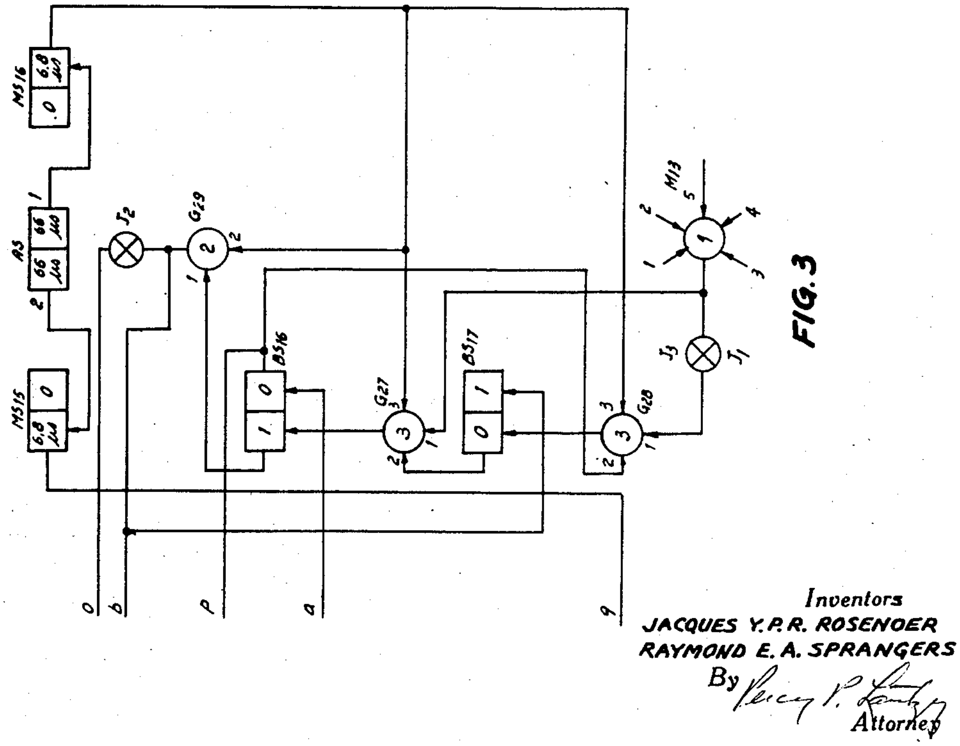
FIG. 3
Inventors
JACQUES Y. P. R. ROSENOER
RAYMOND E. A. SPRANGERS
By Percy P. Lantzy
Attorney

CALCULATING APPARATUS

Filed Sept. 8, 1961 4 Sheets-Sheet 4

Inventors
JACQUES Y.P.R. ROSENOER
RAYMOND E.A. SPRANGERS
By [signature]
Attorney United States Patent Office 3,161,762
Patented Dec. 15, 1964

3,161,762
CALCULATING APPARATUS

Jacques Y. P. R. Rosenoer and Raymond E. A. Sprangers, both of Antwerp, Belgium, assignors to International Standard Electric Corporation, New York, N.Y., a corporation of Delaware Filed Sept. 8, 1961, Ser. No. 137,489
Claims priority, application Netherlands Sept. 14, 1960
5 Claims. (Cl. 235—153)

Figure 1:
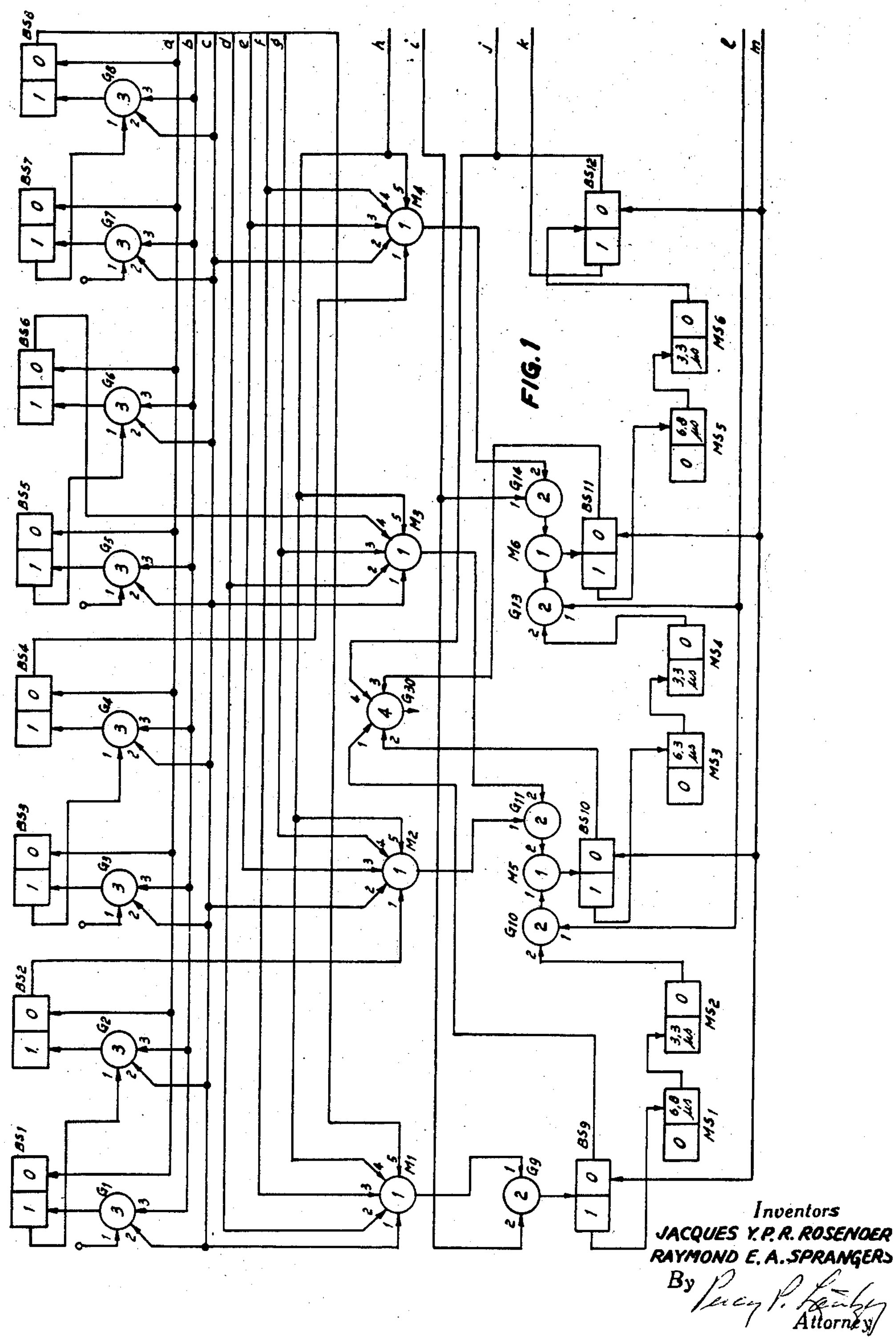

The invention relates to a calculating apparatus for computing a linear digital function of the various digits $a_i$ forming a number, said function involving multiplication of each digit by a factor associated to the rank of the digit, and addition of the resultant products. The said linear function is able to assume any one of $p$ different digital values from zero to $p-1$, where $p$ is a predetermined integer, and where the value of the function is computed modulo $p$ by means of a binary counter, i.e. by taking the least non-negative residues after dividing by $p$. The said calculating apparatus is particularly adapted to provide a proof operation in which manifestations of certain sets of symbols, e.g. certain decimal numbers, are checked for accuracy, such that for an accurate manifestation of any such certain set the various symbols forming the set invariably produce the same final proof condition; i.e. the same value for said linear function, while for an inaccurate manifestation a different proof condition is obtained.

Such a calculating apparatus is already known from the Dutch Patent No. 86,715 wherein the different digits are each fed to a different stage of the counter in cardinal form i.e. each digit is characterized by a number of pulses equal to the digit e.g. digit 7 is characterized by seven consecutive pulses.

This known apparatus is therefore particularly useful for verifying such information as dialled telephone numbers but not binary coded information since in this case a decoder network would be required between the memory unit delivering the coded information and the calculating apparatus which is required to operate in a serial manner.

Also, for the known apparatus, the factors associated to the various ranks must be determined by a mechanism which makes one step as each digit is fed. Moreover, the number of different factors is limited to the number of stages of the binary counter.

It is an object of the present invention to provide a calculating apparatus which readily permits verification of binary coded information, so that this calculating apparatus may be directly fed from a memory unit wherein the information is registered in coded form.

Another object of the invention is to avoid rank ascertaining means in order to determine the factor corresponding to the rank.

The calculating apparatus according to the present invention is characterized by the fact that said digital function is computed by an iterative process, each new function $F_i$ being obtained by first adding $a_i$ to the previous function $F_{i-1}$, taking the sum as the least non-negative residue with respect to $p$, thereafter multiplying this sum residue by 2, and taking the product as the least non-negative residue with respect to $p$. The apparatus is further characterized in that it includes feeding means for feeding each of said digits to said binary counter under the form of sets of binary bits according to a constant weight binary code, each of the weights being a power of 2, in such a manner that the binary bits constituting each digit are respectively applied to the bistable devices of corresponding weight in the counter, thus executing the adding operation, and that it includes doubling means for bringing thereafter each of said bistable devices into a predetermined condition, to execute the multiplication operation.

It is to be noted that a calculating apparatus for computing a digital function by an iterative process is already known per se, e.g. from the Belgian Patent 591,979 (N. Rouche). But the apparatus according to the present invention provides a particularly simple arrangement for proving binary coded digits.

A further object of the invention is to prove digits modulo 11 or 13 without complicating the operation of a 4-stage binary counter.

According to a further characteristic of the invention said binary counter comprises four intercoupled bistable devices having the weights $2^0$, $2^1$, $2^2$ and $2^3$ respectively, one output of the fourth bistable device being coupled to the input of the first and third (or second) bistable devices so that, when said one output is activated, the states of said first and third bistable devices are reversed.

Yet a further object of the invention is to feed the binary coded digits serially bit by bit to the binary counter without lengthening the time required to carry out the multiplication operation.

The invention is further characterized by the fact that said constant weight binary code is the 2–4–2–1 code, e.g. Aiken code, that it includes a fifth bistable device, serving as a memory device, and a timing arrangement for providing four distinct time intervals $t_1$, to $t_4$, that the first bit of each of said digits is fed by said feeding means to said fifth bistable device during time interval $t_1$, whereas the second and fourth bits of each of said digits are fed to said third and first bistable devices, during time intervals $t_2$ and $t_4$ respectively, that when the first bit is a 0 the third bit is fed, during the time interval $t_3$, to said second bistable device via second gating means conditioned by the 0-output of said fifth bistable device, that when the first bit is a 1 the third bit is fed, during the time interval $t_3$, to said second or third bistable devices when it is a 0 or a 1 respectively and via third and fourth gating means which are conditioned by the 1-output of said fifth bistable device, and that said doubling means apply, during the time interval $t_1$, a doubling pulse to all the 0-outputs of said bistable devices in order to reset them to their 0-conditions.

Figure 2:
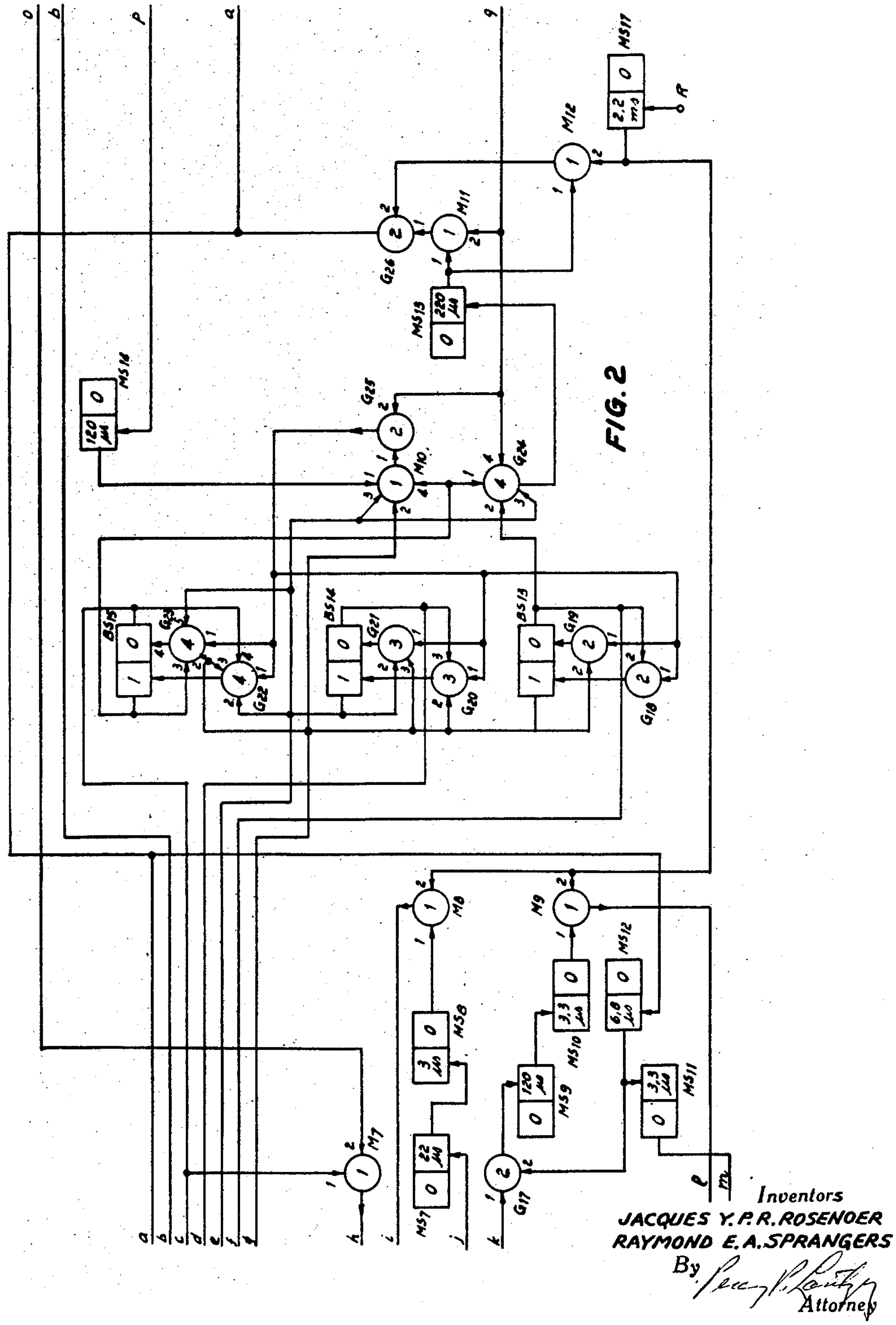

The above mentioned and other objects and features of the invention will become more apparent and the invention itself will be best understood by referring to the following description of embodiments taken in conjunction with the accompanying drawings wherein:

FIGS. 1, 2 and 3 represent the calculating apparatus according to the invention;

FIG. 4 gives pulse wave forms for the apparatus of FIGURES 1, 2, 3.

Figure 5:
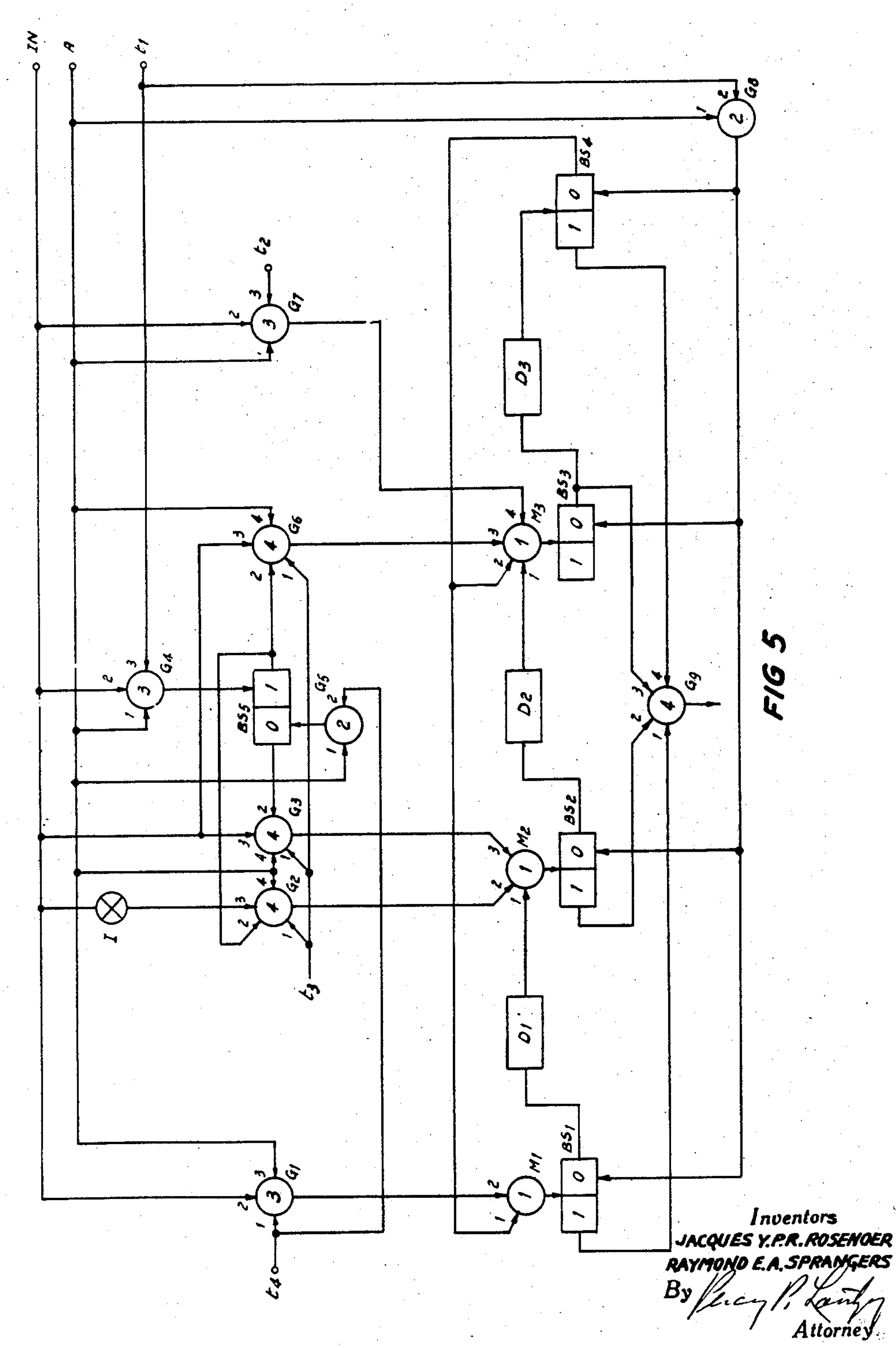

FIG. 5 shows another embodiment of the calculating apparatus according to the invention.

The calculating apparatus will particularly be described for calculating the above mentioned function, the different digits $a_i$ being fed to it under form of the Aiken or 2–4–2–1 code. This code form may for instance be obtained from a coder network operated from digit keys pushed by an operator.

The calculating apparatus principally includes a four stage binary counter comprising four bistable devices $BS_9$ to $BS_{12}$ each functioning as a scale-of-two counter which delivers its 1-output a pulse to the following stage when it is triggered back into its 0-condition.

The four binary bits of each decimal digit $a_i$ respectively have the weights 2, 4, 2 and 1 and since the weights of the first, second, third and fourth stages of the above counter $BS_{9-12}$ are $2^0$, $2^1$, $2^2$ and $2^3$ respectively, the first, second, third and fourth bits of each digit will be fed to the second, third, second and first stages of the counter respectively during four distinct time intervals $t_1$, $t_2$, $t_3$ and which are controlled by a timing arrangement dis-ıssed below.

It should be remarked that all bistable and monostable :vices used in the present calculating apparatus are nor-ally in their 0-condition i.e. with their 0-output activated ıd their state may only be reversed when a negative volt-ȝe step is applied to their input.

The timing arrangement includes an astable multivi-:ator AS (FIG. 3) which continuously produces at its ıtput leads 1 and 2 a first and second series of pulses in hich each pulse has a width equal to half of the basic ming period (66 μs.), the pulses in the two series being ı phase opposition with the respect to each other. The rst and second pulse series are respectively applied to the ıput leads of monostable devices $MS_{16}$ and $MS_{15}$ (FIG. ) which are each triggered to their unstable condition for .8 μs. by the negative edge of each pulse applied there-ı. The 6.8 μs. pulses at the outputs of monostable de-ices $MS_{16}$ and $MS_{15}$ are respectively called A and B ulses.

When the operator pushes a digit key a coder network not shown) is operated which delivers at its four output :ads the four binary bits of the Aiken code of the keyed igit. These four bits are applied to the input leads 1 of ıe coincidence gates $G_1$, $G_3$, $G_5$ and $G_7$ (FIG. 1) respec-vely and also to the input leads 1 to 4 of the OR-gate $I_{13}$. The input 5 of OR-gate $M_{13}$ is activated when the igit keyed is a 0, so that the output of this OR-gate is ontinuously activated upon operation of any digit key.

Due to this the input leads 1 of the coincidence gates $_{27}$ and $G_{28}$ (FIG. 3) are respectively activated and de-ctivated and since the input lead 2 of the gate $G_{27}$ is oincidentally activated by the 0-output of the bistable evice $BS_{17}$, an A pulse is passed via this gate $G_{27}$ to the -input of the bistable device $BS_{16}$ which is thus triggered o its 1-condition by the trailing edge of this A pulse. Jpon deactivation of the 0 output, on output lead *p* of ıistable device $BS_{16}$, the monostable device $MS_{14}$ is ırought to its unstable condition for 120 μs. Simul-aneously the input 2 of the coincidence gate $G_{28}$ is de-ıctivated, preventing further transfer of signals there-hrough.

Due to the 1-output of the bistable device $BS_{16}$ being ıctviated the input 3 of the coincidence gate $G_{29}$ is ac-ivated so that the A pulses, following the one which riggered the bistable device $BS_{16}$, are passed through his gate $G_{29}$.

Due to the output of the monostable device $MS_{14}$ being .ctivated for 120 μs. the output 1 of the OR-gate $M_{10}$ s activated, this output being initially inactive since the nput leads 2, 3 and 4 of the OR-gate are respectively onnected to the initially deactivated 1-outputs of the bi-table devices $BS_{13}$ to $BS_{15}$ (FIG. 2), the latter being in-erconnected to form an 8-state binary counter. It is ıowever to be remarked that if any one of the bistable levices $BS_{13-15}$ is in its 1-condition, the output of the )R-gate $M_{10}$ is activated so that in fact the 120 μs. pulse lelivered by the monostable device $MS_{14}$ only constitutes ı pulse for starting the operation. Indeed, as soon as he output of the gate $M_{10}$ is activated, B pulses are fed hrough the gate $G_{25}$ to the different coincidence gates $_{18}$ to $G_{23}$ which form part of the counter $BS_{13-15}$.

The first of these B pulses triggers bistable device $BS_{13}$ o its 1-condition via the gate $G_{18}$ since the input 2 of this ȝate is conditioned by the normally activated 0-output ɔf the bistable device $BS_{13}$. The second B pulse triggers he bistable device $BS_{13}$ back to its 0-condition via the ȝate $G_{19}$ since the input 2 of this gate is activated, and ılso triggers the bistable device $BS_{14}$ into its 1-condition via the gate $G_{20}$ since the input leads 2 and 3 of this ȝate are both activated. The third B pulse again triggers the bistable device $BS_{13}$ into its 1-condition etc. The dif-ferent states of the bistable devices $BS_{13-15}$ are shown in FIG. 4.

The input 1 of the gate $G_{29}$ being activated the A pulses may be fed through this gate on the one hand via the inverter 12 to the OR-gate $M_7$ (lead 0) and on the other hand to the input leads 3 of the gates $G_1$ to $G_8$ (lead *b*) and to the 1-input of the bistable device $BS_{17}$ which is thus trtiggered to its 1-condition by the trailing edge of the first A pulse applied thereto. The bistable device $BS_{17}$ being in its 1-condition the input 2 of the gate $G_{27}$ is deactivated so that no A pulses may be fed through this gate to the bistable device $BS_{16}$.

Since the input 1 of the OR-gate $M_7$ is conditioned by the 0-output (lead *c*) of the bistable device $BS_{15}$ of the counter $BS_{13-15}$, it is clear that this input 1 will be ac-tivated as long as the bistable device $BS_{15}$ remains in the 0-condition i.e. until the fourth B pulse is applied to the counter $BS_{13-15}$. This means that the output (on lead *h*) of the OR-gate $M_7$ will remain continuously activated during the entire time interval in which the first three in-verted A pulses appearing at the output of the inverter $I_2$ are applied to the input 2 of OR-gate $M_7$, and that only after the fourth B pulse appearing at the output of the gate $G_{25}$ has been applied to the counter $BS_{13-15}$ will, the fourth and following inverted A pulses appearing at the output of the inverter $I_2$, control the output of the OR-gate $M_7$.

As can be seen on the drawings the inputs 2 of AND gates $G_1$ to $G_8$ are also conditioned in common by the above mentioned 0-output of the bistable device $BS_{15}$ (lead *c*) so that only the first three A pulses appearing at the output of AND gate $G_{29}$ (lead *b*) will pass through these gates. The use of three such A pulses represents a safety measure, as will become clear from what fol-lows. As mentioned above the four binary bits con-stituting a digit are respectively applied to the inputs 1 of AND gates $G_1$, $G_3$, $G_5$ and $G_7$. Thus when the keyed information applied is a 1 the corresponding AND-gate input 1 is activated so that the first arriving A pulse is able to trigger the corresponding bistable devices $BS_1$, $BS_3$, $BS_5$ and $BS_7$ to their 1-condition via the gates $G_1$, $G_3$, $G_5$, $G_7$ respectively. However, if any 1 information pulse ap-plied to an input 1 is not suitably shaped, during the time of occurrence of the first A pulse, due to contact vibrations of the corresponding digit key, the pulse appearing at the output of the corresponding gate $G_1$, $G_3$, $G_5$, $G_7$ may not trigger the corresponding bistable device to its 1-condi-tion. Such vibrations generally appear at the start of the key pushing and they are in general damped before the second A pulse arrives so that the second A pulse is then able to trigger the corresponding bistable device.

Afther the appropriate ones of the bistable devices $BS_{1,3,5,7}$ have been set to their 1-condition by binary 1 signals applied to their associated AND-gates, in coopera-tion with the first or second A pulse applied thereto, each of the set devices activates an input 1 of a corresponding one of the gate $G_{2,4,6,8}$ associated to the next following bistable device $BS_{2,4,6,8}$ which is then triggered to its 1-condition by the second or third A pulse. Consequently the input 1 of the OR-gate $M_2$, the input 1 of the OR-gate $M_4$, the input 4 of the OR-gate $M_3$ and the input 5 of the OR-gate $M_1$ are respectively deactivated when the first, second, third and fourth bits of the binary representation of the decimal digit fed to the counter are, respectively, 1.

The signal on input leads 1, 2 and 3 of the OR-gate $M_1$ define the above time interval $t_4$; the signals on input leads 2, 3 and 4 of the OR-gate $M_2$ define the above time interval $t_1$, the signals on the input leads 1, 2, 3 of the OR-gate $M_3$ define the above time interval $t_3$ and finally the signals on input leads 2, 3 and 4 of the OR-gate $M_4$ define the time interval $t_2$. Indeed, considering first the OR-gate $M_2$, the input leads 2, 3 and 4 are respectively connected via the leads *c*, *e* and *g* to the 0-output of the bistable device $BS_{15}$ and the 1-outputs of the bistable de-vices $BS_{14}$ and $BS_{13}$ respectively so that these input leads 2, 3 and 4 are simultaneously deactivated only when the counter $BS_{13-15}$ is in its fourth state.

Supposing that the first bit of the decimal digit fed to the counter is a 1 the input 1 of the OR-gate $M_2$ is thus deactivated so that the fourth inverted A pulse appearing at the output of the inverter $I_2$ (lead 0) is then able to control the output of the OR-gate $M_2$.

In the same manner it may be shown that when the second, third and fourth bits of a digit fed to the calculating apparatus are 1, the fifth, sixth and seventh inverted A pulses appearing at the output of the inverter $I_2$ will control the output of the OR-gates $M_4$, $M_3$ and $M_1$ respectively during the time intervals $t_2$, $t_3$ and $t_4$ respectively.

When the counter constituted by the bistable devices $BS_{13}$ to $BS_{15}$ is in its sixth position, the inputs 1, 2 and 3 of the gate $G_{24}$ are activated so that the next following or seventh B pulse is fed through gate $G_{24}$ to the input of the monostable device $MS_{13}$ which is thus triggered to its unstable condition by the trailing edge of the seventh B pulse. In this manner the output of the OR-gate $M_{11}$ is activated for 220 microseconds so that due to the input 2 of the gate $G_{26}$ being also activated by the same 220 microsecond pulse via the OR-gate $M_{12}$, the B pulses at input 2 of OR-gate 11, are unable to affect the output of gate $G_{26}$. The trailing edge of the 220 microsecond pulse which thus appears at the output of the gate $G_{26}$ resets bistable devices $BS_1$ to $BS_8$ to their 0-conditions and sets the monostable device $MS_{12}$ to its unstable condition for 6.8 microseconds. The same trailing edge also triggers the bistable device $BS_{16}$ back to its 0-condition, so that the input 1 of the gate $G_{29}$ is deactivated thus preventing further passage of A pulses to leads *b* and 0. It is to be remarked that the above trailing edge is produced after the counter $BS_{13-15}$ has been reset to its zero state.

Summarizing, the function of the timing arrangement constituted by the counter $BS_{13-15}$ is to control the production of pulses at the outputs of the OR-gates $M_2$, $M_4$, $M_3$ and $M_1$ during time intervals $t_1$, $t_2$, $t_3$, and $t_4$ respectively and to produce after the counter $BS_{13-15}$ has been reset to its zero position, a pulse for trigggering the bistable devices $BS_{1-8}$ and the monostable device $MS_{12}$ to their 0-condition and unstable condition respectively.

The main element of the calculating apparatus is a binary counter which comprises the bistable devices $BS_9$–$BS_{12}$ each acting as a scale-of-two counter.

The common input of the bistable device $BS_9$ is connected to the output of the coincidence gate $G_9$, the input leads 1 and 2 of which are respectively conditioned by the normally activated output leads of the OR-gates $M_1$ and $M_8$ respectively. The 1-output of bistable device $BS_9$ is connected to the normally deactivated input of the monostable device $MS_1$, the normally deactivated output of which is coupled to the normally deactivated input of the monostable device $MS_2$.

The common input of the bistable device $BS_{10}$ is connected to the output of the OR-gate $M_5$ the input leads 1 and 2 of which are connected to the output leads of the coincidence gates $G_{10}$ and $G_{11}$ respectively. The input leads 1 and 2 of the coincidence gate $G_{10}$ are conditioned by the normally activated output of OR-gate $M_9$ and the normally activated 0-output of the monostable device $MS_2$ respectively, whereas the input leads 1 and 2 of the coincidence gate $G_{11}$ are connected to the normally activated output leads of the OR-gates $M_2$ and $M_3$ respectively.

The coincidence gate $G_{13}$ and the monostable devices $MS_3$ and $MS_4$ associated to the bistable device $BS_{11}$ correspond to the coincidence gate $G_{10}$ and the monostable devices $MS_1$ and $MS_2$ associated to the bistable device $BS_{10}$. The input leads 1 and 2 of the coincidence gate $G_{14}$ are connected to the normally activated output leads of the OR-gates $M_8$ and $M_4$ respectively.

The 1-output of the bistable device $BS_{11}$ is coupled to the common input of the bistable device $BS_{12}$ via the monostable devices $MS_5$ and $MS_6$.

Since the counter $BS_{9-12}$ includes four bistable devices it is able to assume 16 states but as it is the function of the calculating apparatus to count mod *p* wherein $p=11$ it is necessary to suppress 5 of the 16 possible states of the counter.

Therefore the last stage ($BS_{12}$) of the counter is coupled to the first ($BS_9$) and third ($BS_{11}$) stages thereof in the following manner. The normally activated 0-output of the bistable device $BS_{12}$ is coupled (via lead *j*) to the normally deactivated input of the monostable device $MS_7$ and the normally deactivated output of monostable device $MS_7$ is connected to the normally deactivated input of the monostable device $MS_8$. The normally activated 0-output of the monostable device $MS_8$ is, as mentioned above, coupled via the OR-gate $M_8$ and lead *i* to the coincidence gates $G_9$ and $G_{14}$ associated to the bistable devices $BS_9$ and $BS_{11}$ respectively. The other input 2 of the above OR-gate $M_8$ is conditioned by the normally deactivated 1-output of the monostable device $MS_{17}$. As will become clear from what follows it is sometimes necessary to suppress 6 of the 16 possible positions of the counter $BS_{9-12}$. Therefore the normally last stage ($BS_{12}$) of the counter is coupled to the second ($BS_{10}$) and third ($BS_{11}$) stages thereof in the following manner. The deactivated 1-output (lead R) of the bistable device $BS_{12}$ is connected to the input 1 of the gate $G_{17}$, the other input 2 of which is conditioned by the normally deactivated output of the monostable device $MS_{12}$. The output of this gate $G_{17}$ is connected to the normally deactivated input of the monostable device $MS_9$, the normally deactivated output of which is coupled to the normally deactivated input of the monostable device $MS_{10}$. The normally activated 0-output of monostable device $MS_{10}$ is connected via the OR-gate $M_9$ (lead 1) to the input leads 1 of the above mentioned gates $G_{10}$ and $G_{13}$ associated to the bistable devices $BS_{10}$ and $BS_{11}$ respectively. The other input 2 of the OR-gate $M_9$ is also conditioned by the output of the monostable device $MS_{17}$.

The normally deactivated output of the monostable device $MS_{12}$ is further connected to the normally deactivated input of the monostable device $MS_{11}$, the normally activated 0-output of which is connected (via lead *m*) to the 0-inputs of the bistable devices $BS_{9-12}$.

The calculation of the function $$\{[a_0\times 2+a_1)2+a_2]\ 2+\ .\ .\ .\ \}\ \text{mod}\ 11$$

wherein $a_0$, $a_1$, $a_2$ . . . are the different digits of a number, will now be described in detail. It will be appreciated that for certain keyed combinations of decimal digits ($a_1$), the calculated value of the function will be zero (mod 11), and this may be taken as a proof condition indicative of accurate keyings, or, in general, manifestations, of such combinations. Thus, if all input numbers to be selected or keyed—for example, all account numbers in a bookkeeping system—belong to the set of all such certain combinations, the selections are easily verified by this apparatus. For example the number 123 will be proved, so that the following operations have to be made $[(1\times 2)+2]2+3$ i.e. first the first digit 1 is multiplied by 2, then the second digit 2 is added to this product (2), then the resultant sum (4) is multiplied by 2 and finally the third digit 3 is added to the second product (8). Thus the sum, decimal 11, should be obtained or since mod 11, or, in general, mod *p* of this sum is to be taken, the final result should be the proof condition zero.

Therefore the first decimal digit 1, or 0001 in Aiken code, is fed to the calculating apparatus i.e. during the time intervals $t_1$, $t_2$, $t_3$ and $t_4$ the bits 0, 0, 0, 1 are fed to the input leads 1 of the gates $G_1$, $G_3$, $G_5$, $G_7$ respectively. Hence only the bistable device $BS_9$ will be triggered to its 1-condition during the time interval $t_4$ via the gate $G_9$. Since the weights of the bistable devices $BS_{9-13}$ are $2^0$, $2_1$, $2^2$ and $2^3$ respectively, as 1 is registered in the counter.

By the negative trailing edge of the 220 $\mu$s. pulse appearing at the output of the gate $G_{26}$ the monostable device $MS_{12}$ is triggered to its unstable condition. Due to this the monostable device $MS_{11}$ is also triggered to its unstable condition and the 3.3 $\mu$s. or so called doubling pulse appearing at its 0-output is applied to the 0-inputs of the bistable devices $BS_9$ to $BS_{12}$. Due to this the bistable device $BS_9$ is brought back into its initial condition so that its 1-output is deactivated triggering the monostable device $MS_1$ to its unstable condition. Thus, as each bistable device is reset from the 1-condition to the 0-condition a carry pulse is produced. By the trailing edge of the 6.8 $\mu$s. pulse produced at the output of the monostable device $MS_1$ the monostable device $MS_2$ is triggered to its unstable condition and by the negative 3.3 $\mu$s. pulse appearing at its 0-output the output of the gate $G_{10}$ is deactivated so that the bistable device $BS_{10}$ is triggered into its 1-condition via the OR-gate $M_5$. At the end of this resetting operation the counter $BS_{9-12}$ is consequently in the 0010 condition and hence registers the number 2. This tends to indicate that by resetting all the bistable devices $BS_{9-13}$ to their 0-conditions with the help of the so called doubling pulse, the resultant carry pulses will condition the counter to register a number having a value which is twice that of the previously stored number.

The second decimal digit 2 or 0010 in Aiken code of the decimal number 123 may now be fed to the counter. During the time interval $t_3$ a pulse is fed to the bistable device $BS_{10}$ via the gate $G_{11}$ and the OR-gate $M_5$. In this manner the bistable device $BS_{10}$ is triggered back into its 0-condition and due to this a carry pulse is produced at its 1-output setting the bistable device $BS_{11}$ to the 1-condition. After this operation only the bistable device $BS_{11}$ of the counter is in the 1-condition and hence the number 4 is registered in the counter.

Afterwards a doubling pulse is again applied to the bistable devices $BS_{9-12}$ and due to this the bistable device $BS_{11}$ is brought back into its 0-condition producing a carry pulse at its 1-output which triggers the bistable $BS_{12}$ into its 1-condition. The positive pulse appearing at the 1-output of this bistable device is not passed through the gate $G_{17}$ since the input 2 of this gate is deactivated but the negative step appearing at the 0-output of bistable device $BS_{12}$ triggers the monostable device $MS_7$ into its unstable condition. The trailing edge of the pulse thus produced at the output of monostable device $MS_7$ triggers the monostable device $MS_8$ into its unstable condition due to which the bistable devices $BS_9$ and $BS_{11}$ are triggered via the gates $G_9$ and $G_{14}$ respectively. Consequently, after this operation the first, third and fourth stages of the counter are in their 1-conditions, whereas the second stage is in its 0-condition, so that the counter registers the number 13 or 8+5. The adding of 5 has been done for the following reason. After the doubling operation of the digit 4 the counter should be in the position 8, i.e. 3 steps away from the final or zero position of an 11 state counter. Since in fact a 16 state counter is used the counter is at that moment 8 steps away from the above zero position. Hence, to advance the counter to a position wherein it is three steps away from the zero position five counts must be added.

The last decimal digit 3 or 0011 may now be registered. During the time interval $t_3$ the bistable device $BS_{10}$ is triggered to its 1-condition via the gate $G_{11}$ and the OR-gate $M_5$. During the time interval $t_4$ the bistable device $BS_9$ is triggered back to its 0-condition via the gate $G_9$, producing a carry signal at its 1-output, which sets bistable device $BS_{10}$ back to its 0-condition thus producing another carry pulse. In an analogous manner the bistable devices $BS_{11}$ and $BS_{12}$ are reset to their 0-condition so that finally all the bistable devices $BS_9$ to $BS_{12}$ of the counter are in their 0-condition and thus indicate that the number satisfies to the mod 11 proof condition. This may also be physically indicated by connecting the 0-output of the four bistable devices to the four inputs of the coincidence gate $G_{30}$ (FIG. 1) the output of which is connected to the winding of a relay (not shown) via an amplifier. In this manner when all the bistable devices are in their 0-conditions at the end of a proof operation, it is clear that the output of $G_{30}$ will be activated and consequently that the not shown relay will be operated thus indicating that the number fed to the calculating apparatus satisfies the proof condition.

Another particular example, namely the proving of the number 916 will now be described.

When the first digit 9 or 1111 is fed to the counter the following operations take place. During the time interval $t_1$ the bistable device $BS_{10}$ is triggered into its 1-condition; during the time interval $t_2$ the bistable device $BS_{11}$ is triggered into its 1-condition; during the time interval $t_3$ the bistable device $BS_{10}$ is brought back to its 0-condition and hence produces a carry pulse which triggers the bistable device $BS_{11}$ back to its 0-condition. In this manner the latter bistable device $BS_{11}$ also produces a carry pulse which triggers the bistable device $BS_{12}$ into its 1 condition. Finally during the time interval $t_4$ the bistable device $BS_9$ is set to its 1-condition. As the bistable device $BS_{12}$ is brought into its 1-condition the monostable devices $MS_7$ and $MS_8$ are operated so that a trigger pulse is applied via the OR-gate $M_8$ and AND gates $G_9$ and $G_{14}$ to the bistable devices $BS_9$ and $BS_{11}$ respectively which are thus set to their 0 and 1-conditions respectively. Due to this the bistable device $BS_9$ produces a carry pulse which brings the bistable $BS_{10}$ in its 1-condition. At the end of this operation the counter registers the number 14=9+5 since the bistable devices $BS_{10}$ to $BS_{12}$ are in their 1-condition whereas the bistable device $BS_9$ is in its 0-condition.

Afterwards, when the monostable device $MS_{12}$ is triggered to its unstable condition at the start of the doubling operation the input 2 of AND gate $G_{17}$ is activated and due to the bistable $BS_{12}$ being in its 1-condition the output of the gate $G_{17}$ is activated. Also the trailing edge of the pulse appearing at the output of the monostable device $MS_{12}$ triggers the monostable device $MS_{11}$ into its unstable condition which produces the so called doubling pulse. This pulse triggers the bistable devices $BS_{10}$ to $BS_{12}$ back to their 0-conditions so that a carry pulse appears at the 1-outputs of the bistable devices $BS_{10}$ and $BS_{11}$ thus bringing the bistable devices $BS_{11}$ and $BS_{12}$ to the 1-condition. In the same manner as described above the bistable device $BS_{12}$ produces a carry pulse (on lead *i*) towards the stages $BS_9$ and $BS_{11}$ which are set to their 1 and 0 condition respectively. Due to $BS_{11}$ being brought back to its 0-condition a carry pulse is produced at its 1 output which triggers the bistable device $BS_{12}$ back to its 0-condition.

At the end of this operation the counter registers the number 1. This is due to the fact that the carry digit of 5 which has been addd to the digit 9 has also been doubled by the doubling operation so that in fact 10 has been added to the digit 9. Therefore 5 has to be subtracted from this result or since mod 11 of the result has to be taken 6 has to be added. In this manner the counter will register 1+6 or 7 which is right since $(9\times2)$ mod 11=7 has to be finally obtained.

This is done as follows. At the moment the 0-output of the monostable device $MS_{12}$ is again activated, the output of the gate $G_{17}$ becomes deactivated so that the monostable device $MS_9$ is triggered to its unstable condition for 120$\mu$s.

The negative trailing edge of this 120 microsecond pulse triggers the monostable device $MS_{10}$ into its unstable condition for 3.3 microseconds and the leading edge of the pulse thus appearing at the 0-output of monostable device $MS_{10}$ triggers the monostable devices $BS_{10}$ and $BS_{11}$ to the 1-condition via the gates $G_{12}$ and $G_{15}$ respectively thus adding 6 to the previous result 1.

Indeed at the end of this operation the bistable devices $BS_9$–$BS_{11}$ are in the 1-condition whereas the bistable device $BS_{12}$ is in the 0-condition, so that the counter registers the number 7 as required.

The next digits 1 and 6 of the number 916 may then be registered in the counter in an analogous manner to the one described above and at the end of this operation the bistable devices $BS_9$ and $BS_{11}$ should all be in their 0-condition since $$[(0+9)\ 2+1]\ 2+6=44 \text{ and } 44 \bmod 11=0.$$

When the decimal digit 0 or binary 0000 is applied to the calculating apparatus the input 5 of the OR gate $M_{13}$ is activated and due to this the number already registered in the counter will be multiplied by 2.

It may be necessary to reset the calculating apparatus to the zero position e.g. when the number which has been fed to it does not satisfy the proof condition since the different bistables $BS_{1-12}$ are then in arbitrary positions. In this case the monostable device $MS_{17}$ is triggered to its unstable condition for 2.2 milliseconds. Due to this the inputs 2 of AND-gate $G_{26}$ and OR gates $M_8$ and $M_9$ are activated. Due to the input 2 of the gate $G_{26}$ being activated B pulses are allowed to pass through this gate. They are applied on the one hand to the 1-inputs of the bistable devices $BS_{1-8}$ which are thus reset to their 1-condition and on the other hand to the monostable device $MS_{12}$ which is each time triggered to its unstable condition, thus bringing the bistable devices back in their 0-condition. It is to be remarked that the triggering of the bistable device $BS_{12}$ remains without effect on the preceding bistable devices since the input leads 2 of the OR-gates $M_8$ and $M_9$ remain activated during the entire 2.2 millisecond duration of the pulse output of $MS_{17}$.

When it is desired to make the proof by 13 instead of by 11 described below, it is clear that it is sufficient in this case to couple the output of the OR-gate $M_8$ to the bistable devices $BS_9$ and $BS_{10}$ instead of to $BS_9$ and $BS_{11}$ since 3 instead of 5 has to be added. Further the output of the OR-gate $M_9$ must then be coupled to the inputs of the bistable devices $BS_{10}$ and $BS_{12}$ instead of to $BS_{10}$ and $BS_{11}$ since 10 must be added. Indeed, when 3 is doubled, 3 must afterwards be subtracted or since mod 13 of the result is taken, 10 must be added.

The above description discloses how the different bits of each decimal digit are fed to the calculating apparatus, and more especially to the four stage binary counter included therein in accordance to their weight, i.e. 2, 4, 2, 1 respectively, during the time intervals $t_1$, $t_2$, $t_3$ and $t_4$ allotted to each of these bits. Only afterwards is the multiplication, or doubling, operation executed. However by using a memory device to store the first digit during the time interval $t_1$, this time interval may be used for execution of the multiplication operation. This introduces another particular advantage when the code used is the 2–4–2–1 code. Indeed, in the first embodiment the first and third bits of each digit are fed to the binary stage of the counter having the weight 2, during the time intervals $t_1$ and $t_3$ respectively. Hence, when the first binary bit is a 0 and when the third binary bit is a 1 the binary stage with weight 2 is only triggered once. This is also the case when the first binary bit is a 1 and when the third binary bit is a 0. However, when the first binary bit is a 1 and when simultaneously the third binary bit is also a 1 it is clear that the binary stage with weight 2 will be triggered twice. With the fact in mind that two triggerings of the binary stage with weight 2 corresponds to a single triggering of the binary stage with weight 4, another embodiment of the calculating apparatus according to the invention has been designed wherein the first bit of each digit is stored during the time interval $t_1$ in which the multiplication operation is executed, and the binary stage with weight 2 or 4 is triggered during the time interval $t_3$, depending upon the value of the first and third bits. This embodiment will now be described in detail with reference to FIGURE 5.

The calculating apparatus shown therein includes the four stage binary counter constituted by the bistable devices $BS_1$–$BS_4$ each acting as a scale-of-two counter and each being triggered when a positive voltage step is applied thereto. The different time intervals $t_1$–$t_4$ are allotted to the 4 binary bits of each digit fed to the calculating apparatus and the A pulses constitute sensing pulses. The different digits of the information to be proved are serially fed to the apparatus via the input terminal IN while the above sensing or A pulses are applied to this apparatus via the terminal A.

The operation of the above calculating apparatus will become clear from the following.

When the first bit of a binary digit fed to the counter is a 0 the input 2 of the coincidence gate $G_4$ is not activated so that the bistable device $BS_5$ remains in its 0 condition. However, when the first bit of the binary digit fed to the counter is a 1 the input lead 2 of the gate $G_4$ is activated and when an A pulse is applied to the input 1 of this gate during the time interval $t_1$, i.e. when the input 3 of the gate $G_4$ is activated, it is clear that this A pulse will be able to trigger the bistable device $BS_5$ to its 1-condition, thus deactivating the input lead 2 of the AND-gate $G_3$ and activating the input leads 2 of the AND-gates $G_2$ and $G_6$.

If the second bit of the digit fed to the calculating apparatus is a 1 the input 2 of the gate $G_7$ is activated and when an A pulse is applied to the input 1 of this gate during the time interval $t_2$ in which the input 3 of this gate $G_7$ is also activated, the bistable device $BS_3$ is triggered via the OR-gate $M_3$.

When the third bit of the binary digit fed to the calculating apparatus is a 0 the input leads 3 of the gates $G_3$ and $G_6$ are not activated, whereas the input 3 of the gate $G_2$ is activated due to the connection of an inverter I between the input terminal IN and the input lead 3. When now the first bit of the digit is a 1, the input lead 2 of the gate $G_2$ is activated, so that the output lead of gate $G_2$ will be activated when an A pulse is applied to its input 4 during the time interval $t_3$ in which its input 1 is activated. Thus the bistable device $BS_2$ with weight 2 will be triggered via the OR-gate $M_2$. This corresponds to what has been previously explained since if the first bit is a 1 while the third bit is a 0, the binary stage with weight 2 need only be triggered once.

However if the third bit of the digit fed to the calculating apparatus is a 1 the input 3 of the gate $G_2$ will remain deactivated while the input leads 3 of the gates $G_3$ and $G_6$ will be activated. If the first bit of this digit is a 0, the input leads 2 of the gates $G_3$ and $G_6$ are activated and deactivated respectively so that, if a pulse is applied to the input leads 4 of these gates during the time interval $t_3$ in which the input leads 1 of these gates are activated, only the output lead of the gate $G_3$ will become activated and hence will be able to trigger the bistable device $BS_2$ via the OR-gate $M_2$. This corresponds to what has been previously explained since if the first bit of a digit fed to the counter is a 0 while the third bit of this digit is a 1 the binary stage with weight 2 included in the calculating apparatus need only be triggered once. However, if the first bit of the digit fed to the counter is a 1 the input leads 2 of the gates $G_3$ and $G_6$ are respectively deactivated and activated so that, if an A pulse is applied to the input leads 4 of these gates during the time interval $t_3$ when the input leads 1 of these gates are activated, only the output lead of the gate $G_6$ will be activated. In this manner the bistable device $BS_3$ with weight 4 will be triggered via the OR-gate $M_2$. This also corresponds to what has been previously explained since if the first and third binary bits of the digit fed to the counter are both 1 the binary stage of weight 4 must be triggered.

The fourth bit of a digit fed to the calculating apparatus is only able to trigger the bistable device $BS_1$ if it is a 1. Indeed, only in this case is the input lead 2 of the gate $G_1$ activated so that also only in this case can the output lead of this gate $G_1$ become activated by an A pulse applied to the input lead 3 during the time interval $t_4$ in which the input lead 1 of this gate $G_1$ is activated.

As already mentioned above the time interval $t_1$ is used for executing the doubling operation and therefore the gate $G_8$ has been provided. Since the input leads 1 and 2 of this gate are respectively connected to the input terminal A and to the terminal which is activated during the time interval $t_1$, it is clear that during this time interval $t_1$ a number of A pulses may be fed to the 0-inputs of the bistable devices $BS_1$–$BS_4$ in order to reset them to their 0-conditions, thus executing the multiplication operation.

It is also to be remarked that when starting a calculating operation with all the bistable devices in their 0-condition, the counter is in the position corresponding to the decimal number 11 at the end of the operation if the number fed to the calculating apparatus satisfies to the 11 proof. This means that the bistable devices $BS_1$, $BS_2$ and $BS_4$ are then in their 1-condition whereas the bistable device $BS_3$ is in its 0-condition. For detecting the 11 position the outputs 1 of the bistable devices $BS_1$, $BS_2$ and $BS_4$ have therefore been connected to the input leads 1, 2 and 4 of a gate $G_9$, whereas the 0-output of the bistable device $BS_3$ is connected to the input lead 3 of the above gate $G_9$. This counter has only been very schematically represented but it should be remarked that, contrary to the counter $BS_{9-12}$ used in the first embodiment, the counter $BS_{1-4}$ only delivers a carry pulse representative of 5 input counts, towards the stages $BS_1$ and $BS_3$ when it reaches its 16th position i.e. after the last stage $BS_4$ has been triggered back into its 0-condition. This simplifies the counter since a correction carry of 6 such as is required in the first embodiment is never necessary.

It should further also be remarked that although the counter is brought to its position 11 after an 11-proof it need not necessarily be brought back to its zero position before starting another 11 proof.

While the principles of the invention have been described above in connection with specific apparatus, it is to be clearly understood that this description is made only by way of example and not as a limitation on the scope of the invention, as set forth in the objects thereof and in the following claims.

We claim:

1. In apparatus for calculating a linear digital function of the various decimal digits $a_i$ which form a decimal number, for the purpose of verifying a manifestation of said number, the combination of:
   - a binary counter,
   - means for sequentially manifestating each digit of a set of decimal digits in a four bit binary code,
   - means coupled to said manifesting means for applying said manifested digits to said counter with the binary bits thereof individually added into bistable stages of corresponding weight in said counter, and
   - means coupled to said counter for doubling the contents thereof, after each said application of a manifested digit, by resetting all of the bistable stages therein to a predetermined condition and by applying carry signals resulting from said resetting to given stages of said counter,
   - whereby each partial sum resulting from the application of a manifested decimal digit to the said counter is multiplied by the factor 2, and thus whereby successive manifestations of decimal digits are in effect multiplied by successive powers of the factor 2 and summed.

2. Calculating apparatus according to claim 1 wherein said counter comprises:
   - four bistable devices—having the weights $2^0$, $2^1$, $2^2$, and $2^3$, respectively—interconnected to form a $p$-state device where $p$ is a prime integer between 8 and 15, one output of the fourth bistable device being so connected to inputs of certain of the other bistable devices that when said one output is activated the states of the said certain bistable devices are reversed,
   - first gating means having one input coupled to the other output of said fourth bistable device, and having another input controlled by said doubling means, and having an output coupled to said certain bistable devices,
   - so that if said other output of said fourth bistable device is activated during operation of said doubling means the states of said certain devices are reversed.

3. Calculating apparatus according to claim 1 wherein said counter comprises:
   - four bistable devices—having the weights $2^0$, $2^1$, $2^2$, and $2^3$, respectively—interconnected to form a $p$-state device, where $p$ is a prime integer between 8 and 15, one output of the fourth bistable device being so connected to inputs of certain of the other bistable devices that when said one output of said fourth device is activated the states of said certain devices are reversed.

4. Calculating apparatus according to claim 3, wherein said applying means includes:
   - a timing arrangement for sequentially controlling the said additions of said four binary bits of each said decimal digit manifestation, in four distinct time intervals, $t_1$, $t_2$, $t_3$, and $t_4$, respectively; and wherein said doubling means includes:
   - means operative after the application of said four binary bits of each said manifestation to apply a resetting pulse to the 0-inputs of each of said four bistable devices of said counter.

5. Calculating apparatus as claimed in claim 3 wherein:
   - each said decimal digit is manifested in the 2–4–2–1 binary code, e.g. the Aiken code, and wherein said apparatus includes:
     - a fifth bistable device, serving as a memory device,
     - a timing arrangement for controlling said applying means during four distinct time intervals $t_1$ to $t_4$, so that the first binary bit of each said decimal digit is fed by said feeding means to said fifth bistable device during time interval $t_1$, whereas the second and fourth bits of said decimal digit are fed to said third and first bistable devices during time intervals $t_2$ and $t_4$, respectively,
     - second gating means conditioned by the 0-output of said fifth bistable device and by said timing arrangement so that if the first binary bit is a 0 the third bit is fed, during the time interval $t_3$, to said second bistable device, and
     - fourth gating means conditioned by the 1-output of said fifth bistable device and by said timing arrangement, so that if the first bit is a 1 the third bit is fed during the time interval $t_3$, to said second or third bisable devices depending upon whether said third bit is a 0 or a 1, respectively; and wherein said doubling means includes:
       - means operative during the time interval $t_1$ to apply a resetting pulse to all of the 0 inputs of said four bistable devices of said counter in order to reset them to their 0 conditions.

References Cited in the file of this patent

UNITED STATES PATENTS

| | | |
|---|---|---|
| Re. 24,447 | Bloch | Mar. 25, 1958 |
| 2,911,149 | Rouche | Nov. 3, 1959 |
| 3,017,091 | Ulrich | Jan. 16, 1962 |